(12) United States Patent
Bita et al.

(10) Patent No.: US 7,447,811 B2
(45) Date of Patent: Nov. 4, 2008

(54) STORAGE DEVICE, STORAGE CONTROL FIRMWARE ACTIVATION PROGRAM EXCHANGE METHOD, AND PROGRAM PRODUCT FOR ACTIVATING AND EXCHANGING STORAGE CONTROL PROGRAM

(75) Inventors: Joichi Bita, Kahoku (JP); Masanori Honda, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 11/510,645

(22) Filed: Aug. 28, 2006

(65) Prior Publication Data

US 2007/0260775 A1 Nov. 8, 2007

(30) Foreign Application Priority Data

Mar. 31, 2006 (JP) .............................. 2006-096350

(51) Int. Cl.
*G06F 3/00* (2006.01)
*G06F 9/00* (2006.01)
*G06F 9/44* (2006.01)

(52) U.S. Cl. ............................... 710/39; 710/36; 713/2; 717/168

(58) Field of Classification Search ................... 710/36, 710/39; 713/2; 717/168
See application file for complete search history.

(56) References Cited

U.S. PATENT DOCUMENTS 6,240,470 B1 5/2001 Murayama et al.
2006/0277328 A1* 12/2006 Cherian et al. ................ 710/36

FOREIGN PATENT DOCUMENTS

| JP | 11-237957 | 8/1999 |
| JP | 2001-229042 | 8/2001 |
| JP | 2003-131897 | 5/2003 |

* cited by examiner

*Primary Examiner*—Tonia L. M. Dollinger
*Assistant Examiner*—Richard Franklin
(74) *Attorney, Agent, or Firm*—Staas & Halsey LLP

(57) ABSTRACT

A storage control device 2A includes a host interface control unit 3, a storage control firmware A, and electrically rewritable non-volatile memory 7 and, using non-volatile memory 7, stores necessary information during exchange of an activation program of the storage control firmware A, and using the information exchanges the activation program without disconnection to a host 1 and without erroneous response to a command from the host 1.

3 Claims, 8 Drawing Sheets

STORAGE DEVICE, STORAGE CONTROL FIRMWARE ACTIVATION PROGRAM EXCHANGE METHOD, AND PROGRAM PRODUCT FOR ACTIVATING AND EXCHANGING STORAGE CONTROL PROGRAM

CROSS-REFERENCE TO RELATED APPLICATION

This application claims a Conventional priority based on Japanese patent application Serial no. 2006-096350 filed Mar. 31, 2006, the contents of which are incorporated by reference herein.

BACKGROUND OF THE INVENTION

1. Field of the Invention

The present invention relates to a program storage device, a storage control firmware activation program exchange method, and a program product for activating and exchanging storage control program which exchange an activation program of storage control firmware without disconnection to a host and without returning an erroneous response to a command from a host.

2. Description of the Related Art (1) First Related Art

FIG. 7 is an explanatory view of the first related technology. The first related technology is explained below by referring to FIG. 7.

In the first related technology shown in FIG. 7, a disk control device 2 provided with a magnetic disk device group (disk group) such as a RAID device and the like as a storage group connects to a host 1. The disk control device 2 is provided with a host interface controller (hereinafter referred to simply as a host I/F control unit) 3 for interface control with the host 1, and the disk control device 2 includes firmware A for control of a disk group. The firmware A is a disk control firmware, and stores a necessary program for control of the disk group in memory.

The host I/F control unit 3 is provided with a controller 4 for control of a host interface, a firmware B, etc. The firmware B in this case is host interface control firmware and is constituted by memory storing a program for host interface control. The firmware B and firmware A have different configurations of programs.

With the above-mentioned configurations, when a program in the firmware A is activated and exchanged, and there is one disk control device 2, it is reset by the controller 4 in the host I/F control unit 3 for control of the interface with the host 1 in the process of activating and exchanging the program of the firmware A. Therefore, the connection (path) to the host 1 is temporarily disconnected, and the host 1 cannot access to a disk for some time. For the time, the disk cannot be used.

(2) Second Related Art

FIG. 8 is an explanatory view of the second related art. The second related art is explained below by referring to FIG. 8.

In the second related art shown in FIG. 8, two disk control devices (disk control devices 2-1 and 2-2) having the same configuration as the first related art are connected to the host 1 to generate a duplex system (multi-path system). In this case, the host 1 is provided with a multi-path management unit 5 for multi-path control.

When the program of the firmware A in the disk control device 2-1 or 2-2 is exchanged, the following operation is performed. That is, when the activation program of the firmware A in the disk control device 2-1 is exchanged, the disk control device 2-2 is accessed through the path between the host 1 and the disk control device 2-2. In addition, when the activation program of the firmware A in the disk control device 2-2 is exchanged, the host 1 accesses the disk control device 2-1 through the path between the host 1 and the disk control device 2-1.

In the system having the above-mentioned multi-path configuration, it is necessary to perform multi-path management for access to the disk control device on the host side, and it is determined that the disconnection during the exchange of the activation program of the firmware A is an abnormal condition. Therefore, to suppress the abnormality determination in the above-mentioned case, it is necessary not to allow the multi-path management unit 5 in the host 1 to temporarily use a path during exchanging the program, and to allow a path to be restored after exchanging the activation program, thereby requiring the operation by an operator and complicated control.

(3) Third Related Art

The Patent Document 1 (Japanese Patent No. 3437083) is explained below as the third related art. The third related art relates to an input/output control device and its firmware updating method. The following contents are described in the Patent Document 1.

(a) The invention relates to a technology applied to a magnetic disk control device (input/output control device), provided between an upper device and a magnetic disk device, for control of a write/read to a magnetic disk device according to the input/output signal from an upper device, and more specifically to an input/output control device having the activating and exchanging function of exchanging (updating) firmware during a coupling operation with the upper device, and its firmware updating method (Refer to the paragraph [0002] of the Patent Document 1).

(b) All firmware forming the magnetic disk control device (input/output control device) is made activated and exchanged so that the system having the magnetic disk control device can be operated for 24 hours, and it is not necessary to rewrite or update a pointer table, etc., thereby shortening the time required in activating and exchanging (updating) firmware. An input/output control device and its firmware updating method are provided (Refer to the paragraph [0029] of the Patent Document 1).

(4) Fourth Related Art

The Patent Document 2 (Japanese Patent Laid-Open No. 2001-229042) is explained as the fourth related art. The fourth related art relates to a disk control device. The following contents are described in the Patent Document 2.

(a) A disk control device capable of changing a program executed by a processor group without totally stopping a processor group is provided. (Refer to the paragraph [0003] of the Patent Document 2).

(b) A disk control device in which the channel processor and the drive processor process the input/output request using the old program during loading a new program, and the channel processor and the drive processor process the input/output request using the new program after the new program is available in both the channel processor and the drive processor is provided. (Refer to the paragraph [0004] of the Patent Document 2).

(5) Fifth Related Art

The Patent Document 3 (Japanese Patent Laid-Open No. 2003-131897) is explained as the fifth related art. The fifth related art relates to storage having a built-in port. The following contents are described in the Patent Document 3.

(a) By shortening the time in which the port of the storage cannot return a response, the exchange of a micro-program is realized without stopping a server, thereby reducing the load of a storage system administrator when a replacing path software is purchased, a server is stopped, activated, etc. (Refer to the abstract of the Patent Document 3).

(b) One or more spare port is set in the storage of the SAN (storage area network) environment. When a microprogram of a port provided in the storage is exchanged, the attribute information about the port is copied to the spare port from the port to be exchanged, thereby switching the connection between the server and the storage at the spare port. (Refer to the abstract of the Patent Document 3).

SUMMARY OF THE INVENTION

The present invention is constituted as follows to attain the above-mentioned objectives.

(1) A storage device provided with a storage control unit which performs storage control, with connected to a host for operation, and has a host interface control unit for performing interface control with the host, a storage control firmware having a storage control program and electrically rewritable non-volatile memory, wherein necessary information is stored during exchanging an activation program for the storage control firmware using the non-volatile memory, and the activation program is exchanged using the information without disconnection to the host or without an erroneous response to a command from the host, and the storage device comprises: (a) A first unit which stops a process of a command received from the host upon or after an issue of an instruction from an external unit when exchange of an activation program of storage control firmware is started, separately stores information about a command received from the host and an event in the non-volatile memory to hold an ordinal relation between the command and the event, retrieves a command corresponding to a cancellation when the host instructs the cancellation of an issued command, and places the command in an invalid status; (b) A second unit which suppresses an interrupt from the host interface control unit to the storage control firmware when stop of processing the command is completed, continuously transfers the command received from the host to the non-volatile memory, updates an input pointer of a command queue in the non-volatile memory, and controls not to perform processing of the storage control firmware; (c) A third unit which makes the storage control firmware valid by activating new storage control firmware having a new program after exchanging the activation program of the storage control firmware, and performs control to hold contents of the non-volatile memory; (d) A fourth unit which holds a logical connection status with the host without disconnection not to initialize the host interface control unit when activation is performed by the new storage control firmware, thereby performs control of continuing an operation with a status before the activation maintained without resetting the host interface control unit; and (e) A fifth unit which restores a host connection to restore a logical connection status before starting a host command processing after the activation because the storage control firmware forgets the logical connection status with the host by the activation of the new storage control firmware.

(2) A storage device which is provided with storage and a storage control device for controlling the storage with connected to a host for operation, wherein the storage control device is provided with a host interface control unit for performing interface control with the host and storage control firmware having a program for control of the storage, wherein: the host interface control unit is provided with host interface control firmware having a program for interface control with the host, and the host interface control firmware has the function of allowing the host interface control unit to continue an operation during exchanging an activation program of the storage control firmware; the storage control device has electrically rewritable non-volatile memory not cleared during activation after exchanging the activation program of the storage control firmware; the non-volatile memory comprises a command queue sequentially storing a command received from the host, an activation program exchange order table storing ordinal information for use in exchanging an activation program of the storage control firmware, an event table storing event information received from the host, and a host information area storing host information; and the host interface control unit uses the non-volatile memory, stores necessary information during exchanging an activation program of the storage control firmware, and using the information exchanges the activation program of the storage control firmware without disconnection to the host and without an erroneous response to a command from the host.

(3) A method for exchanging an activation program of storage control firmware of a storage device provided with storage control unit which performs storage control, with connected to a host for operation, and has a host interface control unit for performing interface control with the host; storage control firmware having a storage control program; and electrically rewritable non-volatile memory, wherein necessary information is stored during exchanging an activation program for the storage control firmware using the non-volatile memory, and the activation program is exchanged by using the information without disconnection to the host or without an erroneous response to a command from the host, the method comprises: (a) a first procedure of stopping a process of a command received from the host upon or after an issue of an instruction from an external unit when exchange of an activation program of storage control firmware is started, separately storing information about a command received from the host and an event in the non-volatile memory to hold an ordinal relation between the command and the event, retrieving a command corresponding to a cancellation when the host instructs the cancellation of an issued command, and placing the command in an invalid status; (b) a second procedure of suppressing an interrupt from the host interface control unit to the storage control firmware when stop of processing the command is completed, continuously transferring the command received from the host to the non-volatile memory, updating an input pointer of a command queue in the non-volatile memory, and controlling not to perform processing of the storage control firmware; (c) a third procedure of making the storage control firmware valid by activating new storage control firmware having a new program after exchanging the activation program of the storage control firmware, and performing control to hold contents of the non-volatile memory; (d) a fourth procedure of holding a logical connection status with the host without disconnection not to initialize the host interface control unit when activation is performed by the new storage control firmware, thereby performing control of continuing an operation with a status before the activation maintained without resetting the host interface control unit; and (e) a fifth procedure of restoring a host connection to restore a logical connection status before starting a host command processing after the activation because the storage control firmware forgets the logical connection status with the host by the activation of the new storage control firmware.

(4) A method for exchanging an activation program of storage control firmware of a storage device which is provided with storage and a storage control device which controls the storage, with connected to the host for operation, and has a host interface control unit for performing interface control with the host and storage control firmware having a program for control of the storage, wherein: the host interface control unit is provided with host interface control firmware having a program for interface control with the host, and the host interface control firmware has the function of allowing the host interface control unit to continue an operation during exchanging an activation program of the storage control firmware; the storage control device has electrically rewritable non-volatile memory not cleared during activation after exchanging the activation program of the storage control firmware; and the host interface control unit uses the non-volatile memory, stores necessary information during exchanging an activation program of the storage control firmware, and using the information the program comprises: (a) a first procedure of stopping a process of a command received from the host upon or after an issue of an instruction from an external unit when exchange of an activation program of storage control firmware is started, separately storing information about a command received from the host and an event in the non-volatile memory to hold an ordinal relation between the command and the event, retrieving a command corresponding to a cancellation when the host instructs the cancellation of an issued command, and placing the command in an invalid status; (b) a second procedure of suppressing an interrupt from the host interface control unit to the storage control firmware when stop of processing the command is completed, continuously transferring the command received from the host to the non-volatile memory, updating an input pointer of a command queue in the non-volatile memory, and controlling not to perform processing of the storage control firmware; (c) a third procedure of making the storage control firmware valid by activating new storage control firmware having a new program after exchanging the activation program of the storage control firmware, and performing control to hold contents of the non-volatile memory; (d) a fourth procedure of holding a logical connection status with the host without disconnection not to initialize the host interface control unit when activation is performed by the new storage control firmware, thereby performing control of continuing an operation with a status before the activation maintained without resetting the host interface control unit; and (e) a fifth procedure of restoring a host connection to restore a logical connection status before starting a host command processing after the activation because the storage control firmware forgets the logical connection status with the host by the activation of the new storage control firmware.

The operations of the present invention with the above-mentioned configuration are explained below by referring to FIG. 1.

Relating to (1), (2), (3), and (4) above, the storage control device 2 connected to the host 1 has the following operations.

1. The storage control device 2 stops a process of a command received from the host 1 upon or after an issue of an instruction, for example an instruction from an operator and the like, from an external unit when exchange of an activation program of storage control firmware (firmware A) is started; separately stores information about a command received from the host 1 and an event in the electrically rewritable non-volatile memory 7 to hold an ordinal relation between the command and the event; retrieves a command corresponding to a cancellation when the host 1 instructs the cancellation of an issued command; and places the command in an invalid status.

2. The storage control device 2 suppresses an interrupt from the host interface control unit (host I/F control unit 3) to the storage control firmware (firmware A) when stop of processing the command is completed; continuously transfers the command received from the host 1 to the non-volatile memory 7; updates an input pointer of a command queue in the non-volatile memory 7; and controls not to perform processing of the storage control firmware (firmware A).

3. The storage control device 2 makes the storage control firmware valid by activating new storage control firmware (new firmware A) having a new program after exchanging the activation program of the storage control firmware (firmware A); and performs control to hold contents of the non-volatile memory 7.

4. The storage control device 2 holds a logical connection status with the host 1 without disconnection not to initialize the host interface control unit (host I/F control unit 3) when activation is performed by the new storage control firmware (new firmware A); thereby performs control of continuing an operation with a status before the activation maintained without resetting the host interface control unit.

5. The storage control device 2 restores a host connection to restore a logical connection status before starting a host command processing after the activation because the storage control firmware forgets the logical connection status with the host 1 by the activation of the new storage control firmware (new firmware A).

Thus, necessary information during the exchange of an activation program of storage control firmware can be stored in electrically rewritable non-volatile memory, and using the information the activation program can be exchanged without disconnection to the host and without an erroneous response to a command from the host.

The present invention has the following effects. Necessary information during the exchange of an activation program of storage control firmware is stored in electrically rewritable non-volatile memory. Thus, by using the information, the activation program can be exchanged without disconnection to the host and without an erroneous response to a command from the host.

DETAILED DESCRIPTION OF THE PREFERRED EMBODIMENTS

§1 Description of the Outline of the System

The outline of the system is described below by referring to FIG. 1.

Figure 1:
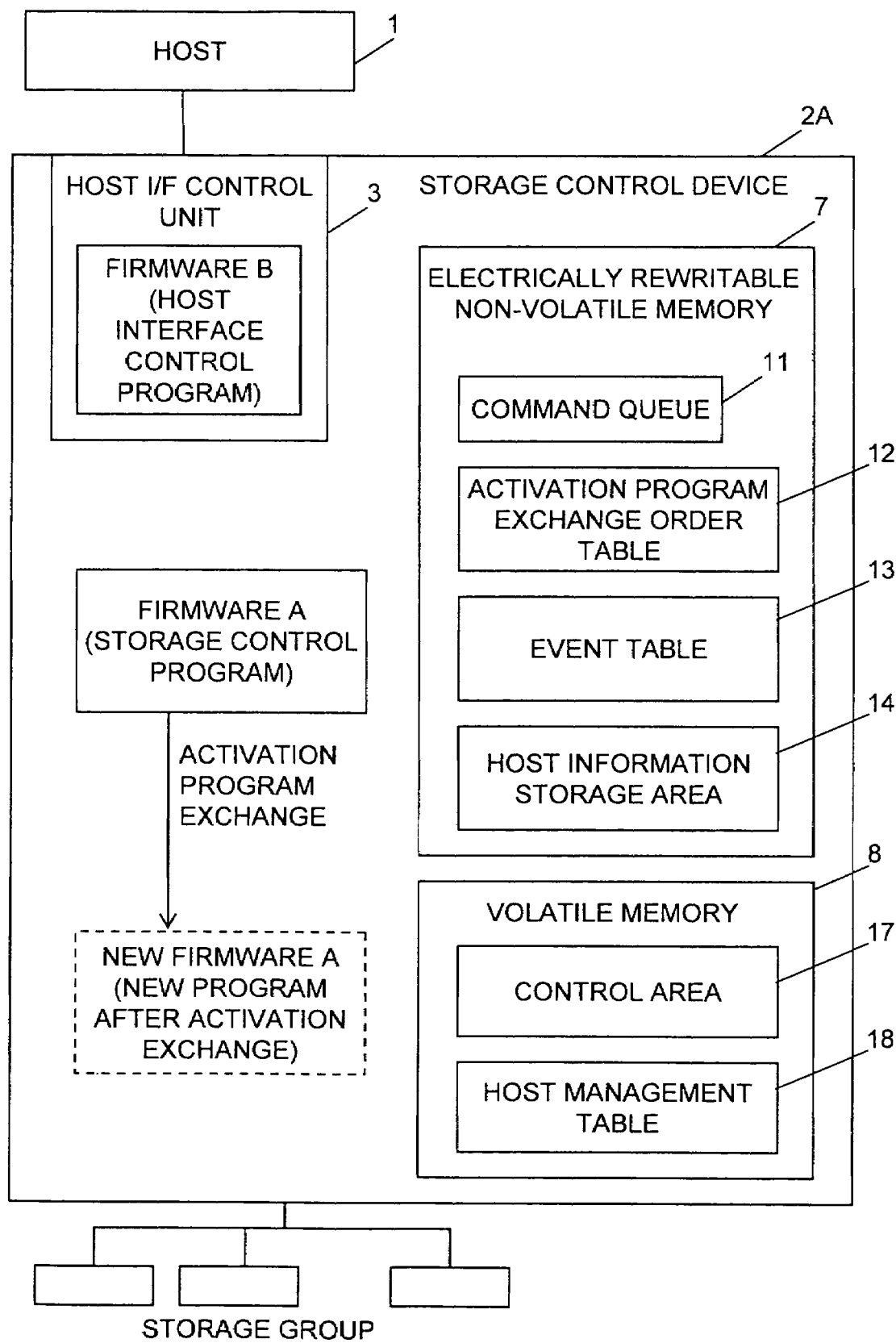
FIG. 1 is an explanatory view showing the principle of the present invention.

The storage device shown in FIG. 1 is provided with storage (or a storage group) and a storage control device 2A for controlling the storage (or a storage group). The storage control device 2A is connected to the host 1 for operation.

The storage control device 2A is provided with a host interface control unit (hereinafter referred to as a "host I/F control unit 3") for interface control with the host 1, storage control firmware (hereinafter referred to as "firmware A") having a program for controlling the storage (or storage group), and a volatile memory 8 accessed by firmware A (storage control firmware).

The host I/F control unit 3 is provided with firmware B (host interface control firmware) having a program for interface control with the host 1. The firmware B (host interface control firmware) has the function of allowing the host I/F control unit 3 to continuously operate during the exchange of an activation program the firmware A (storage control firmware).

The storage control device 2A is provided with electrically rewritable non-volatile memory 7 not cleared during the activation after the exchange of an activation program of the firmware A (storage control firmware). The non-volatile memory 7 is provided with a command queue 11 sequentially storing a command received from the host 1, an activation program exchange order table 12 storing the ordinal information for use in the exchange of an activation program of the firmware A (storage control firmware), an event table 13 storing event information received from the host 1, and a host information area 14 storing the information about the host 1. The host I/F control unit 3 uses the non-volatile memory 7, stores necessary information during the exchange of an activation program of the firmware A (storage control firmware), and using the information, exchanges the activation program of the firmware A (storage control firmware) without disconnection to the host 1 and without an erroneous response to the command from the host 1.

§2 Description of the Configuration of the Disk Control Device

Figure 2:
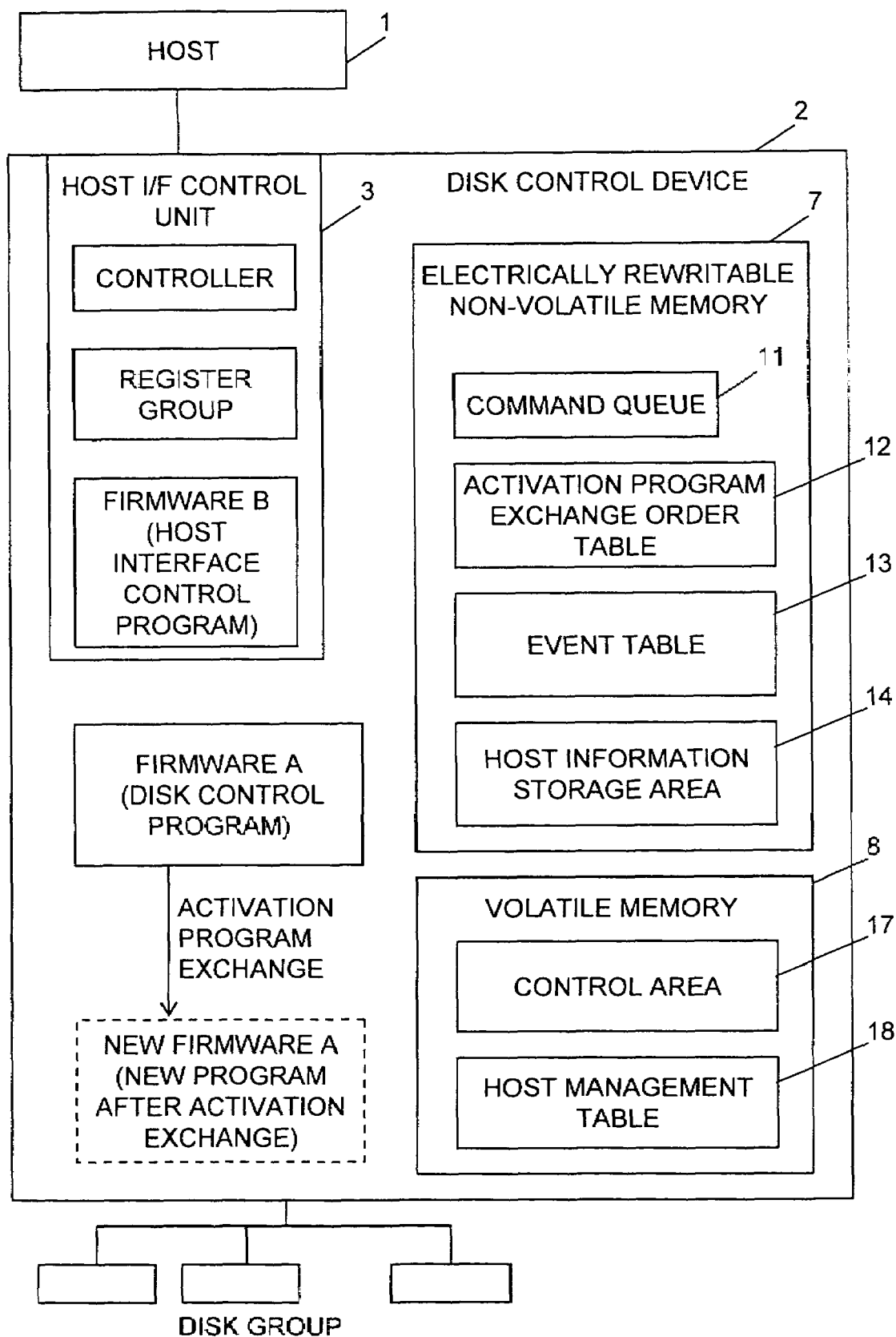
FIG. 2 shows the configuration of the system according to a mode for embodying the present invention.

FIG. 2 shows the configuration of the system. An example of a disk device (magnetic disk device with the RAID configuration) is described below as a practical example of the storage device.

As shown in FIG. 2, the system is provided with the host 1, the disk control device 2 connected to the host 1 via a path, and a disk group (disk group for RAID) is connected to the disk control device 2.

The disk control device 2 is provided with the host interface control unit (described as "host I/F control unit") 3, the electrically rewritable non-volatile memory 7, the volatile memory 8, and disk control firmware (hereinafter referred to as a "firmware A"). The rewritable non-volatile memory 7 is provided with the command queue 11, the activation program exchange order table 12, the event table 13, the host information storage area 14, etc.

The volatile memory 8 is provided with a control area 17 and a host management table 18. The host I/F control unit 3 is provided with the controller 4, the firmware B, a register group, etc. The function of each unit is described below.

(a) The disk control device 2 communicates a command and other data with the host 1, controls a write and a read of data by the control of a disk group, and the host I/F control unit 3 performs various types of host interface control.

(b) The host I/F control unit 3 performs various types of host interface control with the host 1. The controller 4 performs host interface control. The firmware B (host interface control firmware) and the firmware A have different internal program configurations, and perform a rewrite and a read of data for the rewritable non-volatile memory 7. The register group is used as a work register when the host interface control is performed.

(c) The electrically rewritable non-volatile memory 7 is used in writing necessary data or reading written data when an activation program of the firmware A is exchanged, and the write/read process is performed by the control of the host I/F control unit 3.

In this case, the command queue 11 sequentially accumulates a command received from the host. The activation program exchange order table 12 stores data in the order used when the activation program exchange of the firmware A is performed. The event table 13 stores an event received from the host 1. The host information storage area 14 stores the information about the host 1.

The electrically rewritable non-volatile memory 7 is constituted by volatile memory with battery backup (DRAM, SRAM, etc.), flash memory, etc.

(d) The volatile memory 8 is accessed by the firmware A, and the control information is stored in the control area 17, and the host management information is stored in the host management table 18. The volatile memory 8 is constituted by DRAM, SRAM, etc.

§3 Description of Operation of Disk Control Device

Figure 3A:
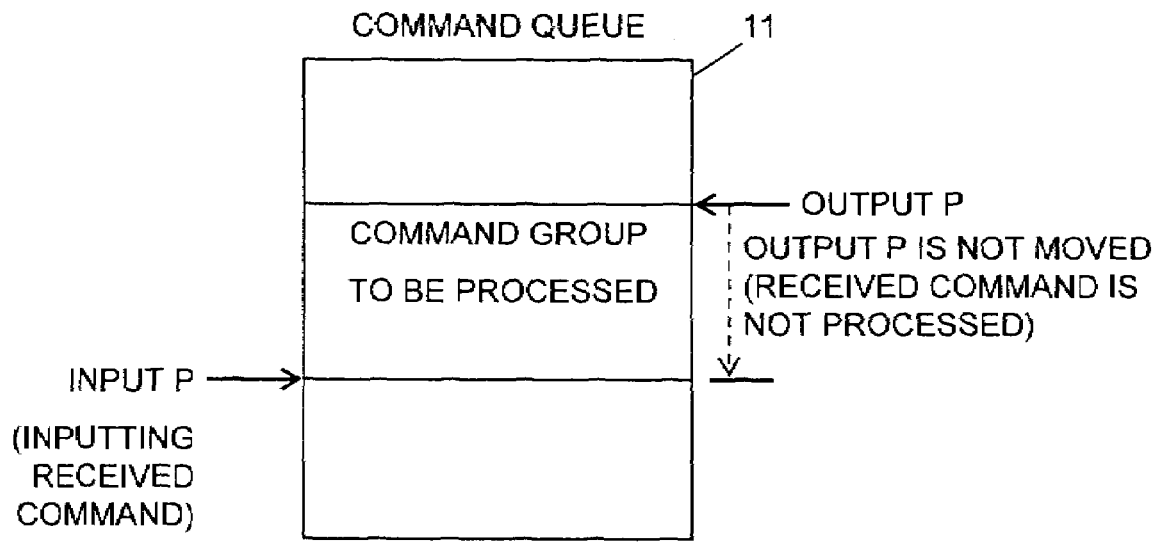
FIGS. 3A and 3B are explanatory views (1) of the operation of the disk control device according to a mode for embodying the present invention, wherein 3A shows the operation of a command queue and 3B shows the operation of holding the ordinal relationship between a command and an event.
Figure 3B:
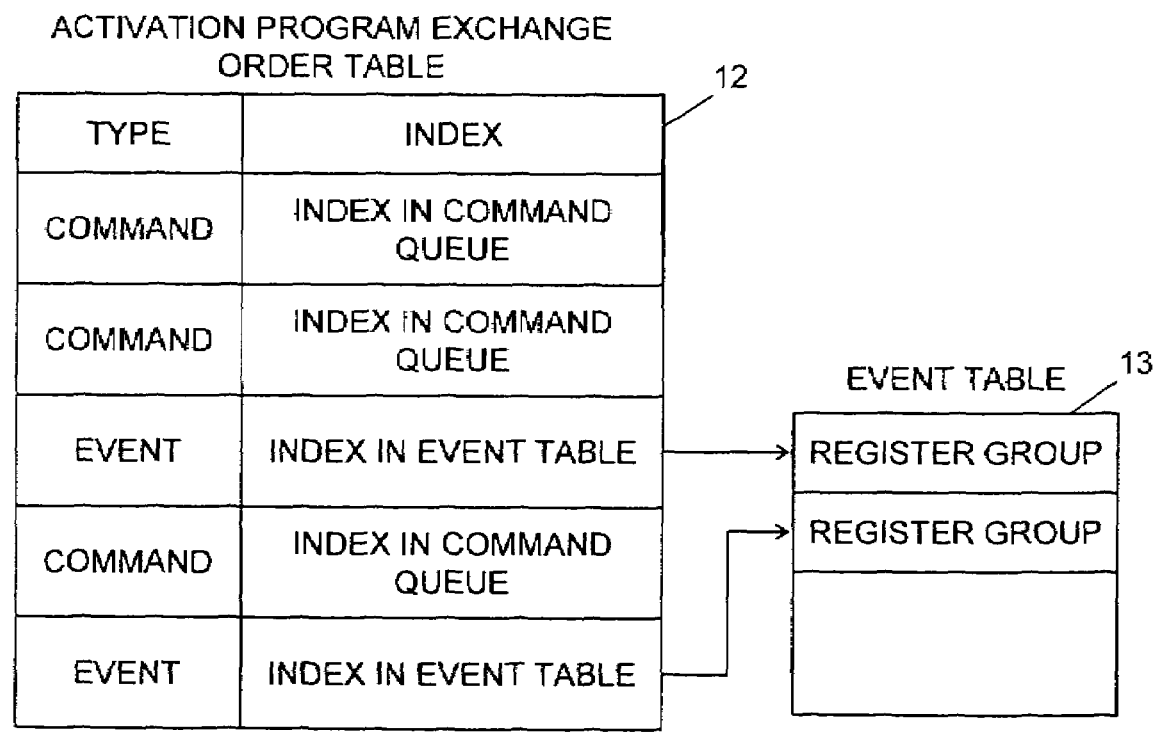
Figure 4:
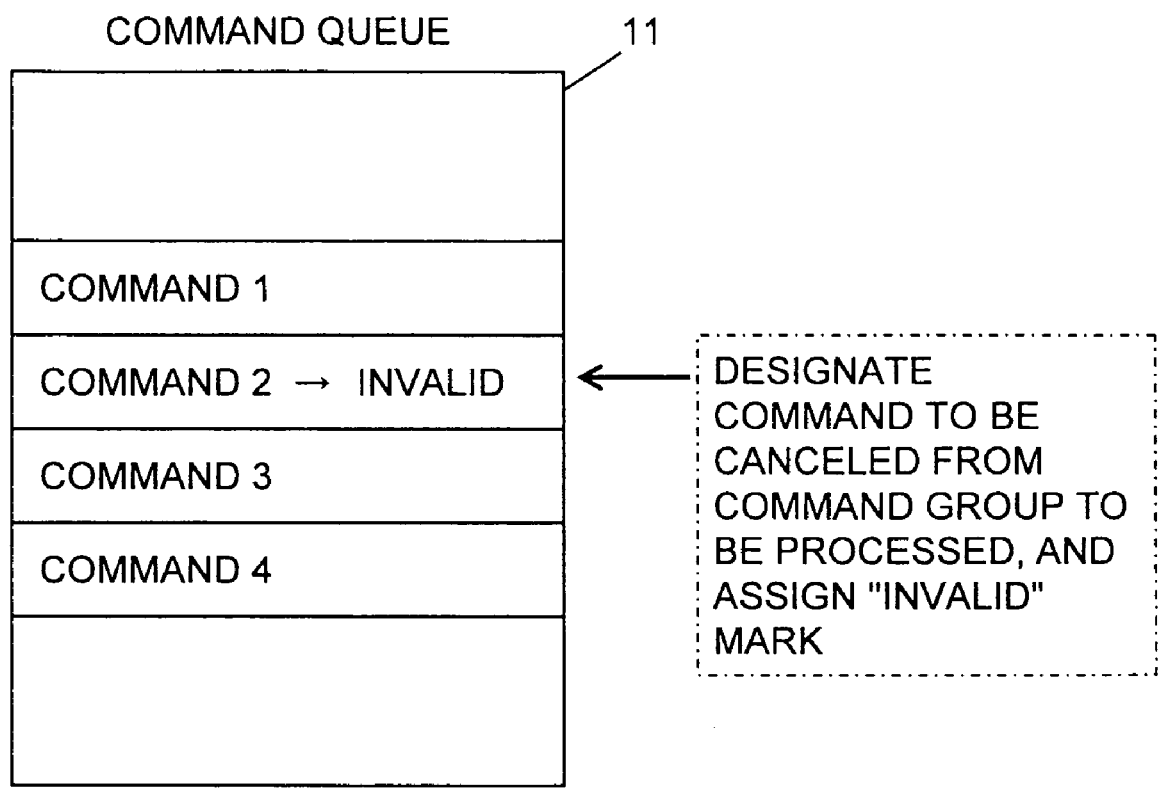
FIG. 4 is an explanatory view (2) of the operation of the disk control device according to a mode for embodying the present invention, wherein A shows the process of a cancel command.
Figure 5A:
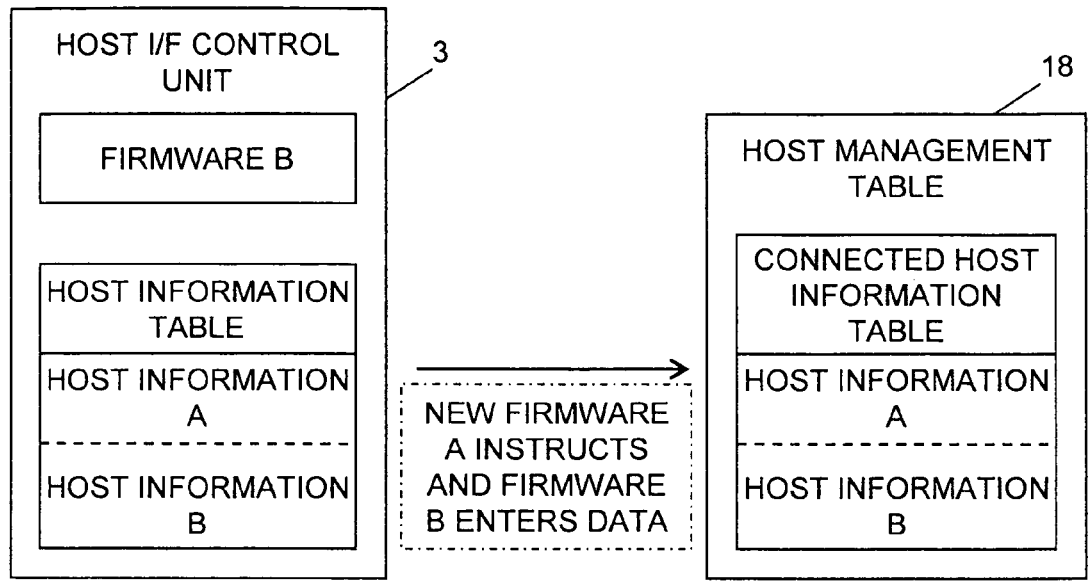
FIGS. 5A and 5B are explanatory views (3) of the operation of the disk control device according to a mode for embodying the present invention, wherein 5A shows an operation of restoring a connection between the new firmware as an example 1 and the host, and 5B shows an operation of restoring a connection between the new firmware as an example 2 and the host.
Figure 5B:
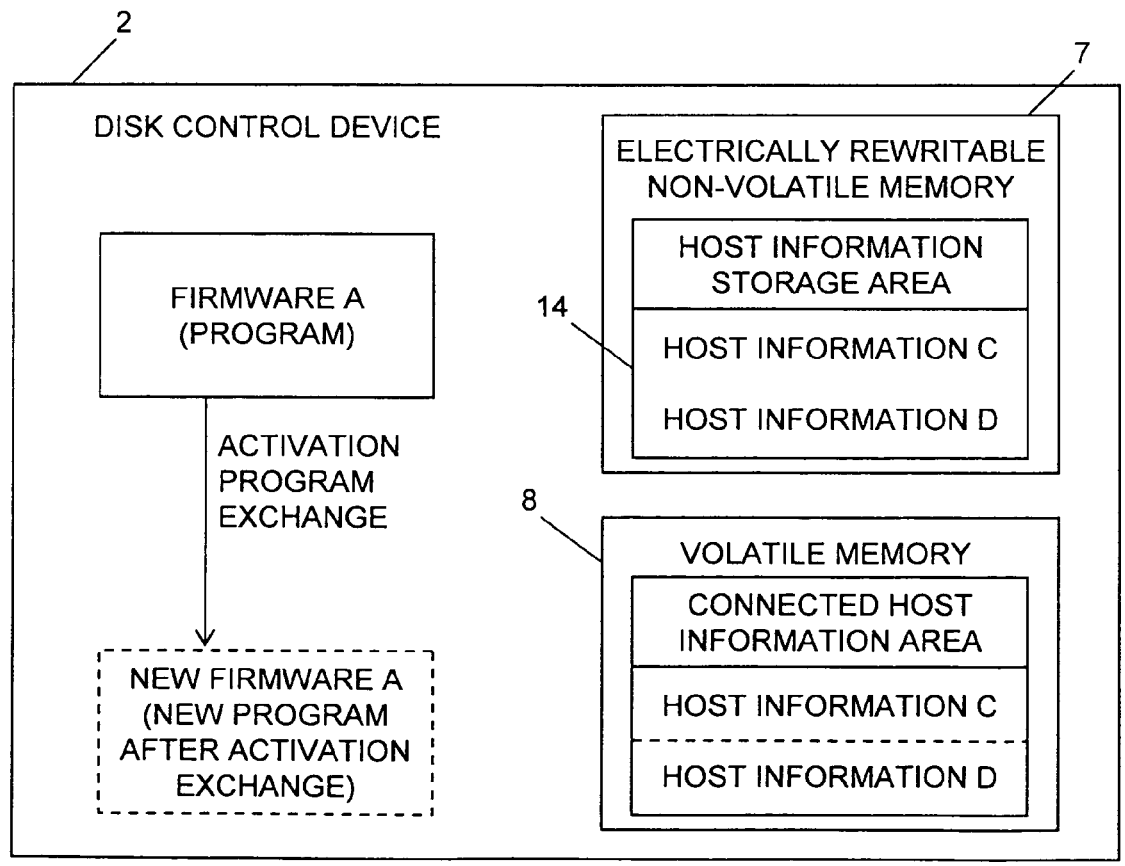

FIGS. 3A and 3B are explanatory views (1) of the operation of the disk control device, wherein 3A shows the operation of a command queue and 3B shows the operation of holding the ordinal relationship between a command and an event. FIG. 4 is an explanatory view (2) of the operation of the disk control device, wherein A shows the process of a cancel command. FIGS. 5A and 5B are explanatory views (3) of the operation of the disk control device, wherein 5A shows an operation of restoring a connection between the new firmware as an example 1 and the host and 5B shows an operation of restoring a connection between the new firmware as an example 2 and the host. The operations of the disk control device are described below by referring to FIGS. 3A, 3B, 4, 5A and 5B.

(a) Operation of Command Queue (Refer to FIG. 3A)

Upon receipt of a command from the host 1, the host I/F control unit 3 sequentially stores the command in the command queue 11 of the electrically rewritable non-volatile memory 7. In the command queue 11, the position of the input P indicates the input position of the command. The position of the output P is moved toward the input P when the command input to the command queue 11 is retrieved for execution.

That is, a command group to be processed is between the input P and the output P. Therefore, during the exchange of the activation program of the firmware A, a received command is not processed. Therefore, the position of the output P is not moved.

(b) Operation of Holding the Ordinal Relationship Between a Command and an Event (Refer to FIG. 3B)

The activation program exchange order table 12 is used in holding the process order when an activation program of the firmware A is exchanged. From the host I/F control unit 3, an event is notified using a command in the command queue 11 and also using the register group in the host I/F control unit 3. Therefore, to hold the ordinal relationship between the event and the command in the command queue 11, the activation program exchange order table 12 and the event table 13 are used.

For example, the activation program exchange order table 12 has type and index columns, and information can be stored in the columns. For example, the first column stores a command type, and an index in a command queue. The second column stores a command type, and an index in a command queue. The third column stores an event type, and an index in an event table. Similarly, the subsequent individually is stored.

The event table 13 stores the information whose index information about the third event and the fifth event in the activation program exchange order table 12 is a register group.

(c) Process of Cancel Command (Refer to FIG. 4)

Furthermore, when a host issues an instruction that a command is cancelled in the commands already received from the host 1, a command to be cancelled (for example, the command 2) is retrieved from a command group to be processed and designated, and the command (for example, the command 2) is marked with "invalid".

(d) Operation of Restoring the Connection Between the New Firmware and the Host in the Example 1 (Refer to FIG. 5A)

In the activation (of the new firmware A by the new program after the exchange of an activation program of the firmware A) by the new program of the firmware A, an interrupt is made to occur by a command from the host I/F control unit 3 to the new firmware A, an exchanged new firmware A is activated (rebooted), and the new firmware A becomes valid. At this time, the contents of the electrically rewritable non-volatile memory 7 are stored (warm reboot).

In the operation of restoring a host connection, the new firmware A forgets the logical connection status (login) to the host 1 after the reboot (activation). Therefore, it is necessary to restore the logical connection status (login) before starting the host command processing after the reboot. One method is to obtain information from the host I/F control unit 3.

In this method, the new firmware A issues an instruction to the firmware B in the host I/F control unit 3. Based on the instruction, the firmware B puts (copies) the host information (host information A, the latest information such as the host information B, etc.) in the host information table in the host I/F control unit 3 in the host management table 18 in the volatile memory 8.

Using the host information in the volatile memory 8, an operation of restoring a connection between the new firmware A (new disk control firmware after exchanging an activation program) and the host 1 is performed.

(e) Operation of Restoring a Connection Between the New Firmware A and the Host 1 in the Example 2 (Refer to FIG. 5B)

In the operation of restoring a host connection, the new firmware A forgets the logical connection status (login) to the host 1 after the reboot (activation). Therefore, it is necessary to restore the logical connection status (login) before starting the host command processing after the reboot (activation).

In this method, the new firmware A puts (copies) the host information stored in the host information storage area 14 in the non-volatile memory 7 in the host management table 18 in the volatile memory 8. Using the host information in the volatile memory 8, the operation of restoring a connection between the new firmware A (new disk control firmware after the exchange of an activation program) and the host 1 is performed.

In this case, as indicated by FIG. 5B, if, for example, the host information such as the host information C, the host information D, etc. is written to the host information storage area 14 of the electrically rewritable non-volatile memory 7, the host information such as the host information C, the host information D, etc. is also copied to the connected host information area of the volatile memory 8 in the above-mentioned process, thereby performing the connection restoring operation.

Figure 6:
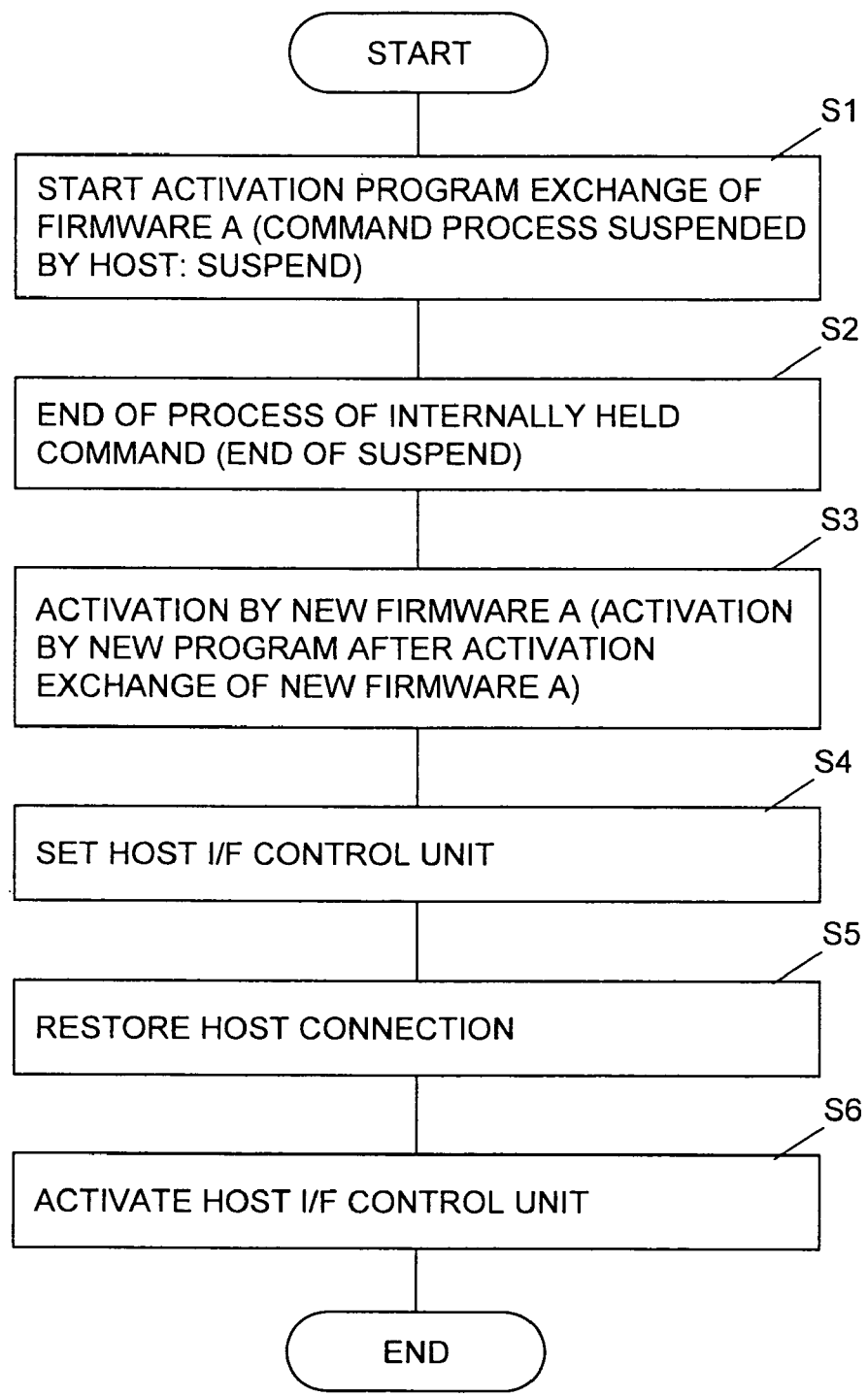
FIG. 6 is a flowchart of the process of the disk control device according to a mode for embodying the present invention.
Figure 7:
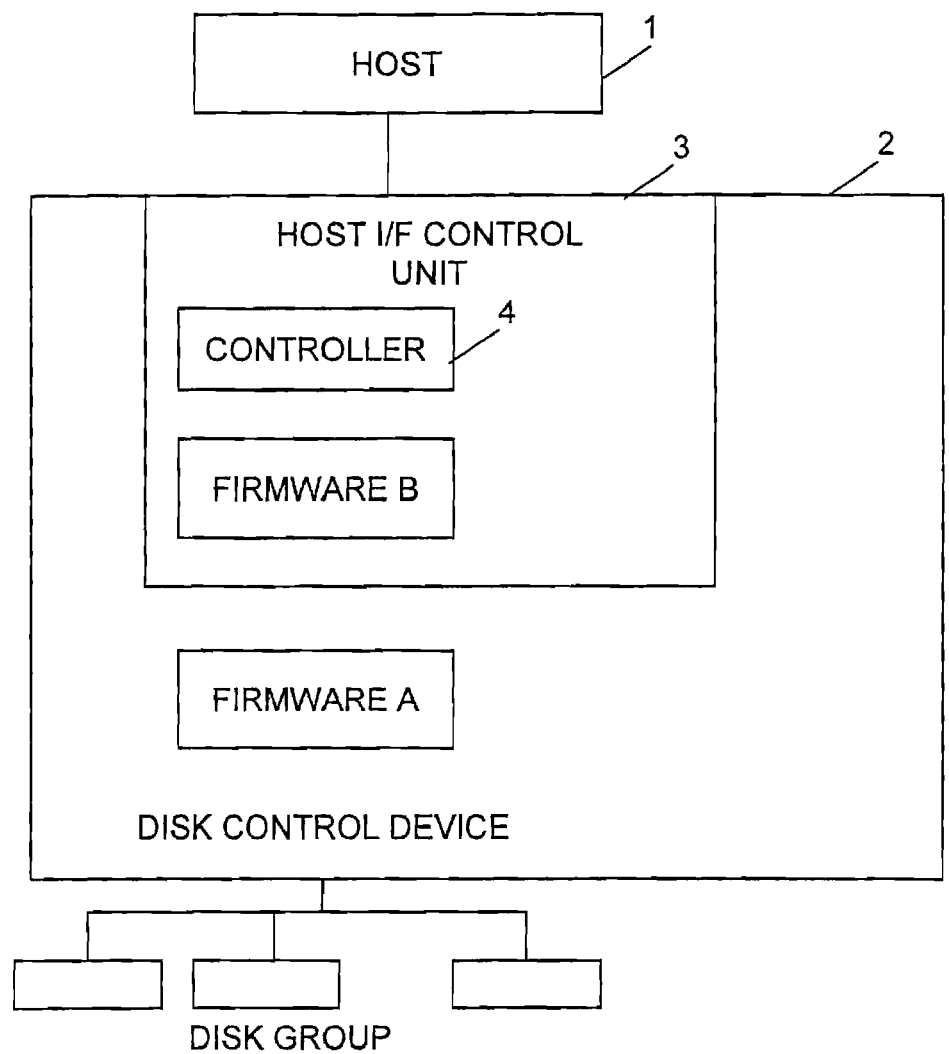
FIG. 7 is an explanatory view of the first related art.
Figure 8:
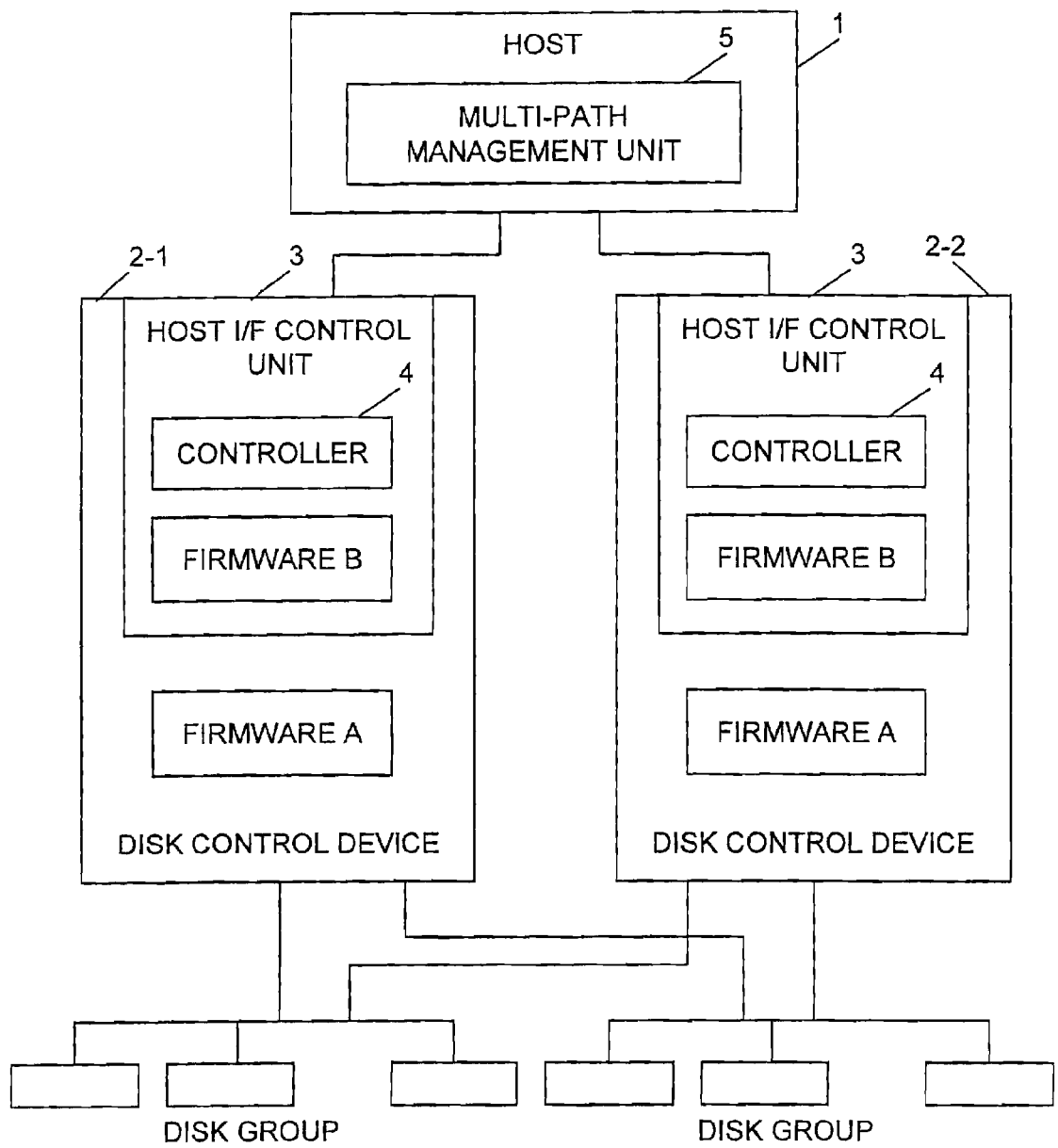
FIG. 8 is an explanatory view of the second related art

§4 Description of the Process of the Disk Control Device During the Exchange of an Activation Program FIG. 6 is a flowchart of the process of the disk control device. The process of the disk control device performed when the activation program of the firmware A is exchanged is described below by referring to FIG. 6. In FIG. 6, S1 to S6 are the respective process steps.

The process is performed to exchange an activation program of the firmware A (disk control firmware) without disconnection to the host 1 and without erroneous response to a command from the host 1.

In the exchange of the activation program, the disk control device 2 holds the rewritable non-volatile memory 7 not cleared during the reboot (activation) after the exchange (rewrite of a program) of a program of the firmware A, and the memory is provided with a storage area storing the information suppressing the connection to the host 1 during the exchange of an activation program.

The host I/F control unit 3 has firmware B different from the firmware A. In the process of the firmware B, the host I/F control unit 3 is kept to continue operating during the exchange of the activation program of the firmware A (A continuously command and other data are communicated with the host 1). Each process in steps S1 to S6 is explained below.

S1: Start exchanging an activation program (stopping the process of a command from the host: "suspend")

Stopping the process of a command from the host 1: In the "suspend" process, the command from the host 1 after an external instruction is issued is not to be processed. The command is input from the host I/F control unit 3 in the area of the command queue 11 in the rewritable non-volatile memory 7 in the normal operation. With the timing, the subsequent command is not activated, and no command is processed (refer to FIG. 3A).

From the host I/F control unit 3, there is not only a command input into the command queue 11 but also an event notified in a register group in the host I/F control unit 3. Therefore, to hold the ordinal relationship between the event and the command in the command queue 11, the activation program exchange order table 12 and the event table 13 are used (refer to FIG. 3B). Furthermore, when the host 1 issues a cancel instruction for the command issued by the host 1, the command corresponding to the cancellation is retrieved, and is set in an invalid status (refer to FIG. 4).

S2: Terminating the process of an internal command held (completion of "suspend")

When the internally held command process is terminated (completion of "suspend"), that is, when the internally held command process for terminating the process of the command received from the host 1 before the exchange of the activation program of the firmware A is terminated, the interrupt from the host I/F control unit 3 to the firmware A is suppressed. The host I/F control unit 3 continuously transfers a command newly received to the command queue 11 in the non-volatile memory 7, and the input pointer (refer to the input P indicated by FIG. 3A) of a command queue is updated, but the process of the firmware A is not performed.

S3: Activation by the new program of the firmware A (activation of the new firmware A by the new program after the exchange of the activation program of the firmware A)

In this operation, by an interrupt by a command from the host I/F control unit 3 to the new firmware A, the exchanged new firmware A is activated (rebooted), and the new firmware A becomes valid. At this time, the contents of the electrically rewritable non-volatile memory 7 are held ("warm reboot").

S4: Setting operation of the host I/F control unit

During "reboot" by the new firmware A (reboot after exchange of an activation program), the initialization of the host I/F control unit 3 is suppressed, and the logical connection status "login" to the host 1 is held without disconnection. Since the host I/F control unit 3 is not reset, it continues operating in the status before the reboot.

In this case, in the host I/F control unit 3, as indicated by A shown in FIG. 5, a host information table is provided. The information (new information) about the host is sequentially updated and accumulated in the host information table. Then, the information is used in the operation of restoring the host connection explained later.

S5: Operation of restoring host connection.

On the other hand, the new firmware A forgets the logical connection status "login" to the host after the reboot. Therefore, it is necessary to restore the logical connection status "login" before starting the host command processing after the reboot. There are two methods.

One method is to obtain the information from the host I/F control unit 3. Another method is to store the information about the connection in the host information storage area 14 of the electrically rewritable non-volatile memory 7 by the new firmware A (firmware after the exchange of an activation program), and to restore it based on the information during the reboot of the new firmware A. That is, in the operation of restoring a connection between the new firmware and the host in the example 1, the new firmware A issues an instruction to the firmware B in the host I/F control unit 3. Based on the instruction, the firmware B puts (copies) the host information in the host information table in the host I/F control unit 3 in the host management table 18 in the volatile memory 8.

In the operation of restoring a connection between the new firmware A and the host 1 in the example 2, the new firmware A puts (copies) the host information stored in the host information storage area 14 in the non-volatile memory 7 in the host management table 18 in the volatile memory 8. Using the host information in the volatile memory 8, the operation of restoring a connection between the new firmware A (new disk control firmware after the exchange of an activation program) and the host 1 is performed.

S6: Activation of the host I/F control unit

At this stage, a command and an event received during the exchange of an activation program of the firmware A are activated. First, an interrupt of the host I/F control unit 3 to the new firmware A is enabled. To guarantee the order of the command and the event received during the exchange of an activation program of the firmware A, the activation is performed based on the order in the activation program exchange order table 12.

If the activation is immediately performed, there is the possibility that the process limit in a disk can be exceeded. Therefore, a check (number of commands and events≧threshold) is made as to whether or not the process limit has been reached when a command is activated. The process limit, the activation is temporarily stopped. The subsequent command activation is performed on the activation program exchange order table 12 when the process limit is released when the activation is confirmed at predetermined intervals (measured by the internal timer) and when acquisition command issued command is completed, and the command in the command queue 11 is activated when there is no command in the activation program exchange order table 12.

§5: Description of the Program and the Storage Medium

The controller 4, the firmware B (host interface control firmware), the firmware A (disk control firmware), etc. in the host I/F control unit 3 of the disk control device 2 shown in FIG. 2 are provided with programs.

These programs are, for example, externally stored as follows, and the programs can also be used in the process and control explained above by execution by the CPU (not shown in the attached drawings).

(a) The program (program data created by another device) stored in the removable disk generated by an external device or in the storage medium of a personal computer is read, and stored in the storage medium in the disk control device 2.

(b) The data of a program, etc. transmitted from another device through a communication line is received through a communication control unit (not shown in the attached drawings), and the data is stored in the storage medium in the disk control device 2.

What is claimed is:

1. A storage device provided with a storage control unit which performs storage control, being connected to a host for operation, and has a host interface control unit for performing interface control with the host, a storage control firmware having a storage control program and electrically rewritable non-volatile memory, wherein necessary information is stored during exchanging an activation program for the storage control firmware using the non-volatile memory, and the activation program is exchanged using the information without disconnection to the host or without an erroneous response to a command from the host, the storage device comprising:

(a) a first unit for stopping a process of a command received from the host upon or after an issue of an instruction from an external unit when exchange of an activation program of storage control firmware is started, separately storing information about a command received from the host and an event in the non-volatile memory to hold an ordinal relation between the command and the event, retrieving a command corresponding to a cancellation when the host instructs the cancellation of an issued command, and placing the command in an invalid status;

(b) a second unit for suppressing an interrupt from the host interface control unit to the storage control firmware when stop of processing the command is completed, continuously transferring the command received from the host to the non-volatile memory, updating an input pointer of a command queue in the non-volatile memory, and controlling not to perform processing of the storage control firmware;

(c) a third unit for making the storage control firmware valid by activating new storage control firmware having a new program after exchanging the activation program of the storage control firmware, and performing control to hold contents of the non- volatile memory;

(d) a fourth unit for holding a logical connection status with the host without disconnection not to initialize the host interface control unit when activation is performed by the new storage control firmware, thereby performing control of continuing an operation with a status before the activation maintained without resetting the host interface control unit; and (e) a fifth unit for restoring a host connection to restore a logical connection status before starting a host command processing after the activation because the storage control firmware forgets the logical connection status with the host by the activation of the new storage control firmware.

2. A storage device which is provided with storage and a storage control device for controlling the storage being connected to a host for operation, wherein the storage control device is provided with a host interface control unit for performing interface control with the host and storage control firmware having a program for control of the storage, wherein:

the host interface control unit is provided with host interface control firmware having a program for interface control with the host, and the host interface control firmware has the function of allowing the host interface control unit to continue an operation during exchanging an activation program of the storage control firmware;

the storage control device has electrically rewritable non-volatile memory which is not cleared during activation after exchanging the activation program of the storage control firmware;

the non-volatile memory comprises a command queue which sequentially stores a command received from the host, an activation program exchange order table which stores ordinal information for use in exchanging an activation program of the storage control firmware, an event table which stores event information received from the host, and a host information area which stores host information; and the host interface control unit uses the non-volatile memory, stores necessary information during exchanging an activation program of the storage control firmware, and, by using the information, exchanges the activation program of the storage control firmware without disconnection to the host and without an erroneous response to a command from the host.

3. A method for exchanging an activation program of storage control firmware of a storage device provided with storage control unit which performs storage control, being connected to a host for operation, and has a host interface control unit for performing interface control with the host; storage control firmware having a storage control program; and electrically rewritable non-volatile memory, wherein necessary information is stored during exchanging an activation program for the storage control firmware using the non-volatile memory, and the activation program is exchanged by using the information without disconnection to the host or without an erroneous response to a command from the host, the method comprising:

(a) a first procedure of stopping a process of a command received from the host upon or after an issue of an instruction from an external unit when exchange of an activation program of storage control firmware is started, separately storing information about a command received from the host and an event in the non-volatile memory to hold an ordinal relation between the command and the event, retrieving a command corresponding to a cancellation when the host instructs the cancellation of an issued command, and placing the command in an invalid status;

(b) a second procedure of suppressing an interrupt from the host interface control unit to the storage control firmware when stop of processing the command is completed, continuously transferring the command received from the host to the non-volatile memory, updating an input pointer of a command queue in the non-volatile memory, and controlling not to perform processing of the storage control firmware;

(c) a third procedure of making the storage control firmware valid by activating new storage control firmware having a new program after exchanging the activation program of the storage control firmware, and performing control to hold contents of the non-volatile memory;

(d) a fourth procedure of holding a logical connection status with the host without disconnection not to initialize the host interface control unit when activation is performed by the new storage control firmware, thereby performing control of continuing an operation with a status before the activation maintained without resetting the host interface control unit; and (e) a fifth procedure of restoring a host connection to restore a logical connection status before starting a host command processing after the activation because the storage control firmware forgets the logical connection status with the host by the activation of the new storage control firmware.

* * * * *